United States Patent [19]
Dolezal

[11] 3,962,408
[45] June 8, 1976

[54] DEHYDRATION OF MAGNESIUM CHLORIDE

[75] Inventor: Henry Dolezal, Salt Lake City, Utah

[73] Assignee: The United States of America as represented by the Secretary of the Interior, Washington, D.C.

[22] Filed: July 14, 1975

[21] Appl. No.: 595,902

[52] U.S. Cl. ............................. 423/498; 423/158
[51] Int. Cl.² .................... C01F 5/34; C01F 5/32; C01F 5/30
[58] Field of Search ............ 423/498, 497, 158, 163

[56] References Cited
UNITED STATES PATENTS

| | | | |
|---|---|---|---|
| 1,389,546 | 8/1921 | Dow | 423/498 |
| 1,557,660 | 10/1925 | Cottringer et al. | 423/498 |
| 1,661,894 | 3/1928 | Griessbach | 423/498 |
| 3,241,915 | 3/1966 | Moolenaar | 423/498 |
| 3,471,250 | 10/1969 | Langer | 423/497 |

*Primary Examiner*—Edward Stern
*Attorney, Agent, or Firm*—Roland H. Shubert; Donald R. Fraser

[57] ABSTRACT

A method for dehydrating magnesium chloride hydrates or brines by complexing with amine hydrochlorides is described. Magnesium chloride hydrate or brine is reacted with an amine hydrochloride to form a complex which is then heated to first drive off water and then at a more elevated temperature to decompose the anhydrous complex into anhydrous magnesium chloride and amine hydrochloride. Any magnesium oxides present in the starting material is converted to the chloride by reaction with the HCl present.

9 Claims, No Drawings

DEHYDRATION OF MAGNESIUM CHLORIDE

BACKGROUND OF THE INVENTION

This invention relates to the preparation of anhydrous magnesium chloride from its brines and hydrates.

In the electrolytic production of magnesium metal, molten, substantially anhydrous magnesium chloride is employed as the electrolyte. Magnesium chloride is very water soluble and crystallizes from solution as the hexahydrate, $MgCl_2.6H_2O$. Simple heating of the salt does not result in dehydration to the anhydrous form. Instead, $Mg_2OCl_2$ and $Mg(OH)_2$ are produced together with HCl. Spray drying a hot saturated solution of magnesium chloride produces a product corresponding approximately to $MgCl_2.2H_2O$ and having about 1% $Mg(OH)_2$; see U.S. Pat. 2,381,994.

Various methods have been prepared for producing anhydrous $MgCl_2$. A number involve the chlorination of MgO or partially dehydrated $MgCl_2$. One method produces essentially water-free magnesium chloride from the hexahydrate by thermal decomposition in a stream of hydrogen chloride gas. The presence of large quantities of corrosive hydrogen chloride and the necessity for maintaining essentially anhydrous conditions are obvious disadvantges.

Another method which the subject of a number of patents starts with ammonium carnallite and heats in two stages to drive off the water and then to fume off the $NH_4Cl$. One drawback is that the recovery and reuse of the $NH_4Cl$ involves a sublimation step. Partial decomposition or hydrolysis of the ammonium chloride results in the formulation of corrosive HCl. In a large scale operation, this can present serious difficulties.

Pat. 2,381,994 shows heating a hydrous form of magnesium chloride with an alcohol to distill off the water and form solution of magnesium chloride from which anhydrous $MgCl_2$ is recovered. Pat. 3,241,915 complexes hydrated $MgCl_2$ with N,N dialkylamides and then decomposes the complex to recover the anhydrous salt. Pat. 3,471,250 shows complexing with various organic compounds containing S, O, P or N. However, these patents do not show the formation of $MgCl_2$ from any magnesium oxides which may be present.

It is an object of this invention to produce essentially anhydrous magnesium chloride from magnesium chlorides hydrates and brines employing an amine hydrochloride complexing agent and decomposing the complex compound to produce the anhydrous salt.

A further object of this invention is to produce essentially anhydrous magnesium chloride from hydrates and brines containing magnesium oxides by reacting with amine hydrochlorides to convert the oxides to the chlorides, forming a complex compound and recovering essentially anhydrous magnesium chloride by thermal decomposition of the complex compound.

A further object of the invention is to employ as amine hydrochlorides in the process the hydrochloride salts of diethylamine, triethylamine, ethylenediamine, aniline, pyridine, toluidene or picoline.

Further objects will become apparent from the following specification and claims.

SUMMARY OF THE INVENTION

The process described and claimed herein comprises contacting magnesium chloride hydrates or magnesium chloride brine, which may have magnesium oxides present as impurities, with a hydrochloride of an amine of the class consisting of diethylamine, triethylamine, ethylenediamine, aniline, pyridine, toluidine or picoline. A complex of the amine hydrochloride and a magnesium chloride hydrate is formed or if the brine is employed, a solution of the complex results.

The complex is heated to drive off the water, leaving an anhydrous product. Thereafter, no further heating, the magnesium chloride-amine hydrochloride product decomposes into anhydrous magnesium chloride and amine hydrochloride. Any magnesium oxides present are converted to magnesium chloride in the process. After the decomposition of the anhydrous complex, the amine hydrochlorides are recovered for reuse. Production of the chloride from magnesium oxides results in the formation of the amine, which is recovered and converted to the hydrochloride salt by adding HCl.

EXAMPLE 1

105 parts of weight of $MgCl_2$, which may be in $MgCl_2.6H_2O$, $MgCl_2.4H_2O$, $MgCl_2.2H_2O$ or in brine, is mixed with 130 parts by weight of aniline hydrochloride, in a 1.1:1 mol ratio, and heated at about 100°C. With the concentrated brine the excess water boils off and hydrated double salts are formed. The equations below depict the reaction.

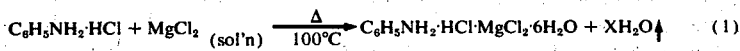
$$C_6H_5NH_2 \cdot HCl + MgCl_2 \text{(sol'n)} \xrightarrow[100°C]{\Delta} C_6H_5NH_2 \cdot HCl \cdot MgCl_2 \cdot 6H_2O + XH_2O\uparrow \quad (1)$$

With the hydrated salts, the reaction is similar, except the excess water is not removed and the complex contains the same water of hydration as the magnesium chloride hydrate starting material. On further heating water of hydration is progressively driven off until at about 180°C, all the water of hydration is removed.

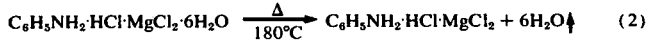
$$C_6H_5NH_2 \cdot HCl \cdot MgCl_2 \cdot 6H_2O \xrightarrow[180°C]{\Delta} C_6H_5NH_2 \cdot HCl \cdot MgCl_2 + 6H_2O\uparrow \quad (2)$$

The steps depicted by equations (1) and (2) are carried out in one operation, although they may be conducted as separate discreet steps if desired.

Any magnesium oxides present in the feed are chlorinated according to the following equation, at about 198°C:

$$MgO + 3C_6H_5NH_2 \cdot HCl \xrightarrow[198°C]{\Delta} C_6H_5NH_2 \cdot HCl_2 + 2C_6H_5NH_2 + H_2O\uparrow \quad (3)$$

The aniline is condensed and reacted with HCl to form aniline hydrochloride, $C_6H_5NH_2.HCl$, for further use in the process.

Anhydrous MgCl$_2$ is prepared by decomposing the complex aniline magnesium chloride compound at an elevated temperature, about 250°–320°C.

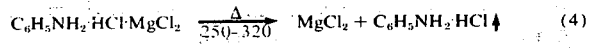

$$C_6H_5NH_2\cdot HCl\cdot MgCl_2 \xrightarrow[250-320]{\Delta} MgCl_2 + C_6H_5NH_2\cdot HCl\uparrow \quad (4)$$

The aniline hydrochloride vapors are condensed and the liquid is used to complex additional magnesium chloride hydrates or brine.

EXAMPLE 2

The process shown in Example 1 was repeated employing pyridine hydrochloride, C$_5$H$_5$N.HCl, instead of the aniline hydrochloride shown therein using the same molar ratio. The same results are obtained as with aniline hydrochloride according to the following equation which corresponds to (1) to (4).

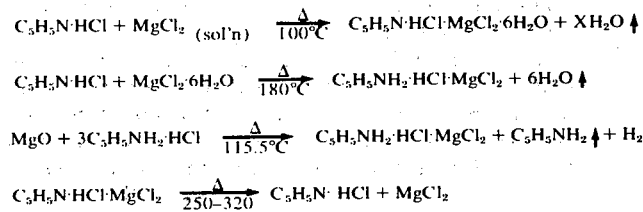

The molar ratios magnesium chloride to amine hydrochloride reactants may be from 1:1 to about 10:1. While upper limit ratio may be beyond 10:1, handling losses in reagent recovery and energy requirements for the larger circulating load make the process uneconomical. As shown in the equations, the magnesium chloride brine or hydrade is heated with the amine hydrochloride to form a magnesium chloride-amine hydrochloride complex, containing water of hydration. The temperature is then raised to drive off the water of hydration and thereafter the essentially anhydrous magnesium chloride-amine hydrochloride complex is decomposed by raising the temperature sufficiently high to drive off the amine hydrochloride which is condensed and recovered.

Amine hydrochlorides other than aniline and pyridine hydrochloride may be employed in the process. These include, but are not limited to, the hydrochlorides of diethylamine, triethylamine, ethylenediamine, toluidine and picoline.

While the process has been described primarily as producing anhydrous magnesium chloride from brines and hydrates containing the same, it may be employed for producing anhydrous magnesium chloride from materials containing appreciable quantities of oxides and oxychlorides.

What is claimed is:

1. A method for dehydrating magnesium chloride compositions comprising magnesium chloride hydrates or magnesium chloride brines which comprises:
   adding to said composition an amine hydrochloride of the group consisting of diethylamine, triethylamine, ethylene diamine, aniline, pyridine, toluidine or picoline, in a mole ratio of MgCl$_2$: amine hydrochloride of at least 1:1;
   forming a complex of magnesium chloride hydrate and amine hydrochloride;
   first heating said complex to drive off water and thereafter heating said complex at a more elevated temperature to decompose the dehydrated complex into substantially anhydrous magnesium chloride and amine hydrochloride.

2. The method of claim 1 wherein the magnesium chloride brines or hydrates contain oxygen compounds of magnesium and wherein said oxygen compounds react with the amine hydrochlorides to form magnesium chloride.

3. The method of claim 1 wherein the mol ratio of MgCl$_2$ to amine hydrochloride is about 1.1 to 1.

4. The method of claim 1 wherein the amine hydrochloride is aniline hydrochloride.

5. The method of claim 1 wherein the amine hydrochloride is pyridine hydrochloride.

6. The method of claim 4 wherein the mol ratio of MgCl$_2$ to aniline hydrochloride is about 1.1 to 1.

7. The method of claim 5 wherein the mol ratio of MgCl$_2$ to pyridine hydrochloride is about 1.1 to 1.

8. The method of claim 2 wherein the amine hydrochloride is aniline hydrochloride.

9. The method of claim 2 wherein the amine hydrochloride is pyridine hydrochloride.

* * * * *